United States Patent [19]

Hoppe

[11] 3,927,568
[45] Dec. 23, 1975

[54] MEANS FOR IMPROVING LINEARITY OF BEARINGLESS FLOWMETER HAVING RING-SHAPED ROTOR OPERATING IN COMBINATION WITH A VORTEX CHAMBER BY CONTROLLING TURBULENCE PRODUCED BY JET PATHWAYS

[76] Inventor: David E. Hoppe, 294 Beacon St., Boston, Mass. 02116

[22] Filed: Nov. 20, 1973

[21] Appl. No.: 417,508

[52] U.S. Cl................................... 73/229; 73/253
[51] Int. Cl.².......................................... G01F 1/06
[58] Field of Search.......... 73/194 C, 229, 23 R, 253

[56] References Cited
UNITED STATES PATENTS

| 3,447,373 | 6/1969 | McNabb | 73/229 |
| 3,630,082 | 12/1971 | Frayssinoux | 73/231 |
| 3,842,672 | 10/1974 | Schneider | 73/253 |

Primary Examiner—Herbert Goldstein

[57] ABSTRACT

It is discovered that the linearity of the Bearingless Flowmeter as described in U.S. Pat. No. 3,447,343 can be significantly improved by the control of the effective turbulence produced by the jet pathways of the meter jet ring. Means to control the turbulence include the introduction of any one of a variety of kinds of discontinuities in the jet pathways as well as the selection of the type and degree of jet pathway surface irregularities to be produced in the manufacture of the meter.

8 Claims, 9 Drawing Figures

MEANS FOR IMPROVING LINEARITY OF BEARINGLESS FLOWMETER HAVING RING-SHAPED ROTOR OPERATING IN COMBINATION WITH A VORTEX CHAMBER BY CONTROLLING TURBULENCE PRODUCED BY JET PATHWAYS

This invention relates to improvements in the operation of the Bearingless Flowmeter, subject of U.S. Pat. No. 3,447,343 issued June 3, 1969, the inventor being McNabb. The McNabb meter, as disclosed therein, was a completely original type of meter, being unique in having a ring-shaped rotor operating within a vortex type of chamber, the rotor being completely free-spinning and maintained in a stable rotational position entirely by means of fluid hydrodynamic action, and thus without mechanical constraints of any kind. It has proved to be the case that the McNabb disclosure did not teach a commercially acceptable device, in that embodiments made in accordance therewith did not achieve acceptable linearity. The practical application of a flowmeter involves stringent requirements and the user usually insists upon linearity in terms of ± 0.5 percent or ± 1 percent of meter reading, and it was not found possible to meet this type of requirement. It was assumed that acceptable linearity could be achieved by modifying the geometry of the meter in the course of experimentation along lines thought to be promising. However, years of effort and experimentation proved this not to be the case, in that acceptable linearity appeared to be impossible to achieve by meter redesign. As a consequence the commercial exploitation of the McNabb meter appeared in doubt, and the solution to the problem of non-linearity appeared not soluble, or at least not apparent to those skilled in the art. Extensive expermination and expenditure of both time and money to the end of providing a solution to the problem of non-linearity had not produced successful results.

It is the inventor's discovery and the subject of the instant disclosure, that satisfactory linearity may be achieved through the modification of the jet pathways to control the fluid turbulence produced therein and thereby. The results obtained from this type of control produces effects and meter performance other than that related to the general varying of dimensional parameters such as the diameter and length of the jets, or other geometries of meter chamber and enclosed rotor such as size and profile. The discovery herein permits and teaches the manufacture of meters having acceptable linear operating characteristics, such that these modified meters are practically useful, as opposed to the prior art devices. Linearity figures of ± 0.5 percent are readily achieved in the practise of this invention. It is a matter of historical fact that this discovery and improvement was not taught or suggested in the prior art, nor obvious to a routine experimenter or available as a result of such routine experimenting, these avenues having been explored thoroughly. As is true of many original and useful discoveries, the improvement is strikingly simple and easily understood, once the discovery has been disclosed. However, the long-felt need for better meter linearity could not be supplied until the present discovery had been made. Practice had taught, up till the time of the present discovery, that it was essential to employ the highest quality machining and manufacture methods to produce this meter so that it would show good repeatability, and this practice taught that any departure from a good clean machined surface would tend to produce a poor meter. Often, poor performance could be traced to irregularities introduced in the fabricating process. For these and other reasons, it was unexpected that a departure from the production of a relatively clean jet bore or pathway would have any beneficial results, much less the result of improving meter linearity.

Figure 1:
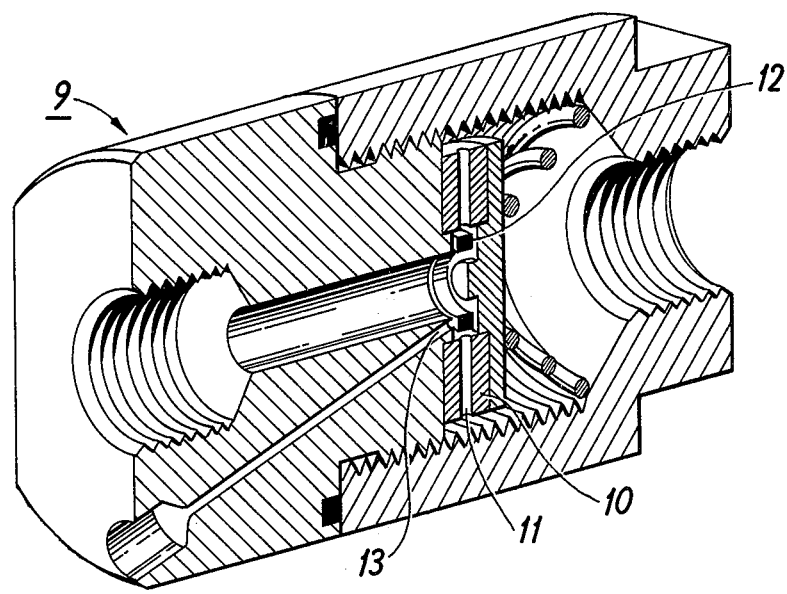
FIG. 1 shows a flowmeter of the prior art including an operating chamber and jet ring.
Figure 2:
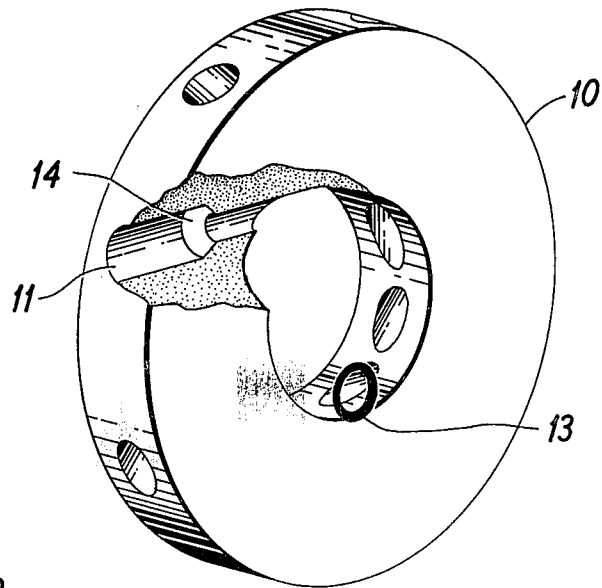
FIG. 2 shows a modified jet ring having round jets incorporating a discontinuity in the surface in the form of a step.
Figure 3:
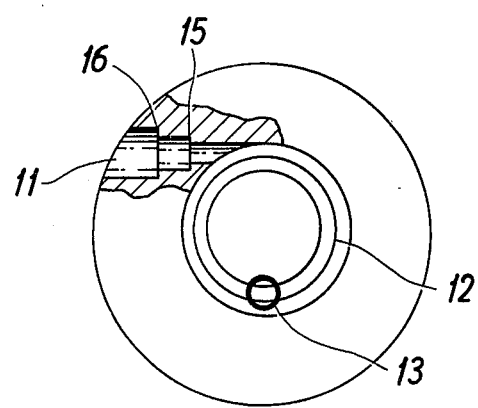
FIG. 3 shows a modified jet ring having jets with more than one step therein.
Figure 4:
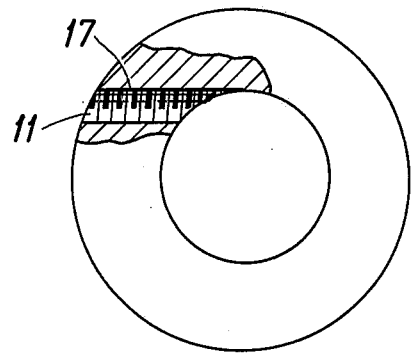
FIG. 4 shows a modified jet ring having round jets with internal threads produced by tapping to produce a controlled discontinuous surface.
Figure 5:
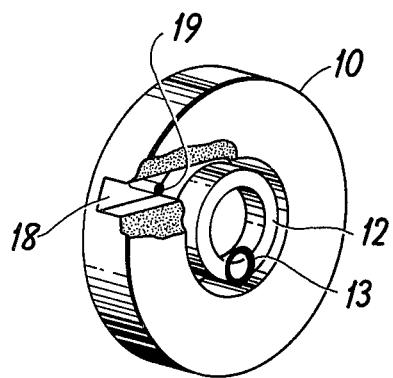
FIG. 5 shows a modified jet ring having jets of rectangular cross-section with means for producing fluid turbulence in the jet pathways.

FIG. 1 shows the McNabb meter 9, showing jet ring 10, jets 11, rotor 12, and a readout sensing means 13. It is understood that a plurality of jets 11 is incorporated in jet ring 10. FIG. 2 shows the jet ring 10 of FIG. 1 modified in accordance with the invention by the introduction of a step 14. A simple means of producing step 14 in the production of jet ring 10 is to employ a drill size of slightly larger diameter than that the narrowest section of the jet uses, for enlarging the diameter of jet 11 over a portion thereof, thereby providing step 14 in the region of discontinuity between the two drill sizes employed in the fabrication. It is understood that each jet 11 incorporated in jet ring 10 has a step 14 introduced within, so that all jets 11 are essentially similar. FIG. 3 shows an alternative modification of jets 11, in which two steps 15 and 16 are introduced. It is understood that any desired number of steps may be employed, as desired. FIG. 4 shows a round jet 11 threaded by tapping means which produces a jet surface 17 having a plurality of surface irregularities or discontinuities in the form of the threading of surface 17. FIG. 5 shows jet ring 10 modified with rectangular jets 18, such as may be made by milling or sawing, or produced by molding, wherein jets 18 incorporate a pin or rod 19 in the jet pathways for producing the requisite controlled fluid turbulence. It is to be understood that pin 19 may be employed in conjunction with round jets as well to obtain controlled fluid turbulence in the jet pathways.

Figure 6:
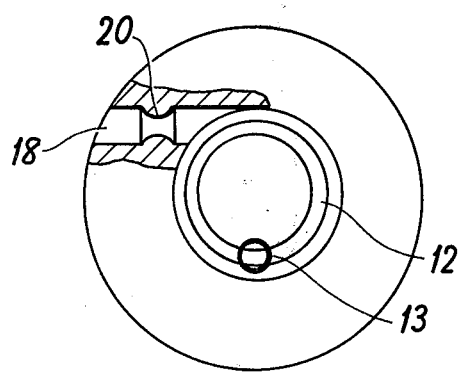
FIG. 6 shows a modified jet ring having jets of rectangular cross-section employing a restriction for producing the requisite controlled fluid turbulence.
Figure 7:
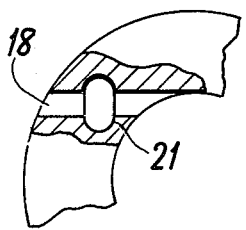
FIG. 7 shows a modified jet ring having jets of rectangular cross-section employing an enlargement for the jet discontinuity.
Figure 8:
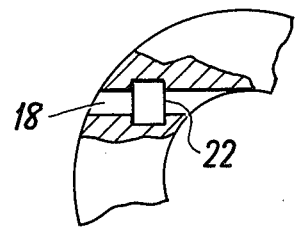
FIG. 8 shows a modified jet ring having a discontinuity in the form of a rectangular cut-out.

FIG. 6 shows another means of producing controlled turbulence within and by a rectangular jet 18, as by including a restriction 20 in the length of jet 18. Molding or milling processes readily may provide for the fabrication of this type of jet. FIG. 7 shows a modification of rectangular jet 18 by incorporating a discontinuity 21 therealong in the form of an enlargement, such as may readily be formed by conventional fabrication processes. FIG. 8 shows yet another means to produce controlled fluid turbulence by jet 18, in the form of cut-out 22.

Figure 9:
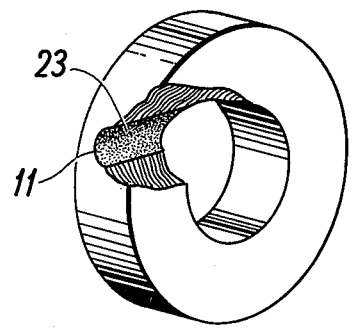
FIG. 9 shows a modified jet ring having discontinuity means in the jet pathways in the form of relatively minor surface irregularities selected to produce the requisite fluid turbulence.

FIG. 9 depicts means to control the fluid turbulence produced by the jet pathways 11 or 18, by selecting the kind and degree of surface irregularity. The surface of the jet pathways may be treated by other means than by tapping, shown in FIG. 4, such as by means of striating, scoring, sandblasting, or etching, or any means such as will control the surface irregularities to the end of producing in effect those surface discontinuities that will produce the requisite controlled fluid turbulence. Generally, it will be found that the modification and control of surface irregularity or finish 23 can be employed to improve meter linearity.

Given the discovery that the types of modifications herein described are means useable for the control of turbulence produced by the flowmeter jets resulting in the alteration of flowmeter linearity, it becomes the subject of routine experimentation to determine the relative dimensions of the particular turbulence modifying means employed, such as the selection of drill sizes in connection with the fabrication of the embodiments of FIGS. 2, 3 and 4, or the degree of surface irregularity required in the case of the embodiments in accordance with FIG. 9. It will become apparent to one skilled in the art that the appropriate selection and degree of modification relates to the desired parameters of linearity. For example, in connection with the embodiments of the invention in accordance with the description relating to FIG. 2, it has been found that the step 14 heigth is generally in the range of from 3 to 10 per cent of the jet 11 diameter. Put another way, it is found that the optimum difference in drill size diameters falls in the range of 6 to 20 per cent.

It is thought that the invention functions to cause the effective Reynolds number produced within the flowmeter to be more uniformly proportional to flow rate, than without such modification. There is reason to believe that the rotor speed is related closely to effective Reynolds numbers of the fluid. For the purpose of defining this type of meter, it will be referred to as a combination of a ring-shaped rotor in a vortex type of chamber to produce an operative flowmeter. Referring to the Figures, the vortex is produced by the action of jets 11 in jet ring 10, such vortex surrounding and acting to rotate rotor 12 therein, with readout 13 positioned to detect the rotation of rotor 12 relative thereto.

The modifications of the jets in the jet ring include all types of irregularities or discontinuities, within the jets. It is found that the best practice is to introduce an equal modification to each of the jets employed, whatever the number. However, modification to some of the jets may be omitted if the principle of balance is observed; that is, if one jet is left unmodified, the jet 180° opposite should also be left unmodified, else the meter operation is likely to be so unbalanced as to produce instability. Other examples of partial numbers of modification of jets may be obvious with a view to maintaining balance, as where twelve jets are employed altogether, it is possible to preserve balance with three unmodified jets by selecting such three to be 120° apart.

What is claimed is:

1. In a bearingless flowmeter having a chamber with a rotor positioned therein and having a plurality of jets located around the periphery of said chamber and each jet being adapted to direct fluid into said chamber and each jet being angularly oriented to produce a fluid vortex having an axial component of flow through said chamber and around said rotor, the improvement comprising
means to increase the turbulence of said fluid flowing through at least some of said jets into said chamber and with said means being applied to said at least some of said jets in a balanced disposition about the periphery of said chamber so that in the operation of said rotor in response to said fluid passing through said chamber improved linearity of flowmeter operation is thereby obtained.

2. The improvement of claim 1 wherein said turbulence of said fluid is cause to be substantially proportional to the flow rate of the fluid passing through said bearingless flowmeter over at least a range of flow rates.

3. The improvement of claim 1 wherein said means consists of the introduction of a uniform irregularity in each jet so affecting said condition.

4. The improvement of claim 1 wherein said jets are round and said means to comprises a plurality of diameters in the construction of said jets.

5. The improvement of claim 1 wherein said means comprises a preselected surface irregularity for each jet so affecting said condition.

6. In a bearingless flowmeter having a chamber with a rotor positioned therein and having a plurality of jets located around the periphery of said chamber and each jet being adapted to direct fluid into said chamber and each jet being angularly oriented to produce a fluid vortex having an axial component of flow through said chamber and around said rotor, a method of improving the linearity of said flowmeter operation comprising the step of increasing the turbulence of said fluid passing through at least some of said jets in a balanced disposition about the periphery of said chamber.

7. The method of claim 6 wherein said step is performed by the action of fluid flowing through jets having preselected discontinuities introduced therewith.

8. The method of claim 6 wherein said step is performed by the action of said fluid flowing through jets having preselected irregularities introduced therewith.

* * * * *